United States Patent
Yang et al.

(10) Patent No.: US 10,187,668 B2
(45) Date of Patent: Jan. 22, 2019

(54) METHOD, SYSTEM AND SERVER FOR LIVE STREAMING AUDIO-VIDEO FILE

(71) Applicant: TENCENT TECHNOLOGY (SHENZHEN) COMPANY LIMITED, Shenzhen (CN)

(72) Inventors: Fenghai Yang, Shenzhen (CN); Yuandong Tu, Shenzhen (CN); Cancheng Zhong, Shenzhen (CN); Xinhai Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/647,335

(22) Filed: Jul. 12, 2017

(65) Prior Publication Data

US 2017/0311006 A1 Oct. 26, 2017

Related U.S. Application Data

(63) Continuation of application No. PCT/CN2016/074847, filed on Feb. 29, 2016.

(30) Foreign Application Priority Data

Mar. 3, 2015 (CN) .......................... 2015 1 0094319

(51) Int. Cl.
*H04N 21/234* (2011.01)
*H04N 21/2343* (2011.01)
(Continued)

(52) U.S. Cl.
CPC ......... *H04N 21/234* (2013.01); *H04N 19/146* (2014.11); *H04N 19/44* (2014.11);
(Continued)

(58) Field of Classification Search
USPC .................................................. 386/239–248
See application file for complete search history.

(56) References Cited

U.S. PATENT DOCUMENTS

2006/0036759 A1* 2/2006 Shen ................. H04L 29/06027
709/234
2007/0143493 A1 6/2007 Mullig
(Continued)

FOREIGN PATENT DOCUMENTS

CN 102036102 A 4/2011
CN 102724551 A 10/2012
(Continued)

OTHER PUBLICATIONS

International Search Report in international application No. PCT/CN2016/074847, dated Jun. 3, 2016.
English Translation of the Written Opinion of the International Search Authority in international application No. PCT/CN2016/074847, dated Jun. 3, 2016.
Notification of the First Office Action of Chinese application No. 201510094319.X , dated Jun. 2, 2017.
(Continued)

*Primary Examiner* — Hung Q Dang
(74) *Attorney, Agent, or Firm* — Syncoda LLC; Feng Ma; Junjie Feng (57) ABSTRACT

A method for live streaming an audio-video file is disclosed, in which an original audio-video file is obtained; an audio frame and a video frame are read from the original audio-video file; the video frame is transcoded into video frames with different code rates; the video frames with different code rates are synthesized respectively with the audio frame into audio-video files with different code rates; the audio frames and the video frames are extracted from the audio-video files with different code rates respectively to form respective video streams; and different video streams are pushed.

16 Claims, 10 Drawing Sheets

(51) Int. Cl.
*H04N 21/63* (2011.01)
*H04N 21/2368* (2011.01)
*H04N 19/44* (2014.01)
*H04N 19/146* (2014.01)
*H04N 21/262* (2011.01)
*H04N 19/40* (2014.01)

(52) U.S. Cl.
CPC ... *H04N 21/2368* (2013.01); *H04N 21/23439* (2013.01); *H04N 21/234354* (2013.01); *H04N 21/26208* (2013.01); *H04N 21/631* (2013.01); *H04N 19/40* (2014.11)

(56) References Cited

U.S. PATENT DOCUMENTS

| | | | |
|---|---|---|---|
| 2007/0239787 | A1 | 10/2007 | Cunningham |
| 2009/0060032 | A1 | 3/2009 | Schmit et al. |
| 2010/0166387 | A1 | 7/2010 | Miyake |
| 2012/0170642 | A1 | 7/2012 | Braness |
| 2013/0156105 | A1* | 6/2013 | Corey ............ H04N 19/105 375/240.16 |
| 2013/0243079 | A1* | 9/2013 | Harris ............ H04L 65/605 375/240.02 |
| 2013/0336627 | A1 | 12/2013 | Calvert |
| 2014/0177700 | A1 | 6/2014 | Schmidt |
| 2014/0208361 | A1 | 7/2014 | Tanaka |
| 2014/0208374 | A1 | 7/2014 | Delaunay |
| 2014/0281007 | A1 | 9/2014 | Lemmons et al. |
| 2016/0119404 | A1* | 4/2016 | Bowen ............ G06Q 10/0631 709/217 |
| 2017/0311006 | A1 | 10/2017 | Yang et al. |

FOREIGN PATENT DOCUMENTS

| | | |
|---|---|---|
| CN | 102957902 A | 3/2013 |
| CN | 103200425 A | 7/2013 |
| CN | 103327401 A | 9/2013 |
| CN | 103873888 A | 6/2014 |
| CN | 103905841 A | 7/2014 |
| CN | 104349178 A | 2/2015 |
| CN | 104754366 A | 7/2015 |
| JP | 2006197401 A | 7/2006 |
| JP | 2007067645 A | 3/2007 |
| JP | 2008252525 A | 10/2008 |
| JP | 2010068498 A | 3/2010 |
| JP | 2012508485 A | 4/2012 |
| JP | 2013051691 A | 3/2013 |
| JP | 2014506430 A | 3/2014 |
| JP | 2014529812 A | 11/2014 |
| KR | 20140134716 A | 11/2014 |
| WO | 2013123360 A1 | 8/2013 |
| WO | 2014105355 A2 | 7/2014 |

OTHER PUBLICATIONS

Notification of the Second Office Action of Chinese application No. 201510094319.X, dated Nov. 16, 2017.
"Synchronization of video and audio in MPEG-2" pp. 116-117, Yepin, Lu, Principle and Application of Digitial Television, Jun. 30, 2009.
English Translation of the Notification of the First Office Action of Korean application No. 10-2017-7024380, dated Jun. 20, 2018.
English Translation of the Notification of the Second Office Action of Japanese application No. 2014-546078, dated Oct. 2, 2018.
Yuzo Senda, "seamless video service and video transformer coda", NEC technical report, vol. 51, No. 8, NEC Creativity, Aug. 25, 1998, the 46-49th page, ISSN:0285-4139 (Document showing a well-known technique).
Chin-Feng Lai, et al., "Cloud-Assisted Real-Time Transrating for HTTP Live Streaming", IEEE Wireless Communications, vol. 20, No. 3, Jul. 1, 2013, pp. 62-70, ISSN: 1536-1284, <DOI: 10.1109-/MWC.2013.6549284> (Document showing a well-known technique).
Proposal of Simultaneous Viewing System for Streaming Contents with the Time Tag, Kazuki Nakamura et. al, vol. 2012, No. 1, Jun. 27, 2012, p. 660~668, ISSN:1882-0840 (Example of well-known technique).
Sheng Wei, et al., "Cost Effective Video Streaming Using Server Push Over HTTP 2.0", Proceedings of 2014 IEEE 16th International Workshop, on Multimedia Signal. Processing (MMSP), Sep. 24, 2014, pp. 1-5, ISBN: 978-1-4799-5896-2, <DOI: 10.1109/MMSP. 2014.6958796> (refer to Fig.2 (c)).
"The semantic—Chinese dictionary-Weblio Japan—China Chinese—Japanese dictionary of anchor", [online] and Mar. 17, 2016, Weblio, https://cjjc.weblio.jp/content/%E4%B8%BB%E6%92%AD.
"anchor [net program personality]", [online], Aug. 2016, and Peoples' China (people China), [Heisei 30(2018) Sep. 20 search] and the Internet, <URL: http://www.peoplechina.com.cn/home/second/2016-08/26/content_726616_htm> (although it is document which became publicly known after the priority date of this application, it mentions by reference).
Beauty anchor 10 million-year surprised Sicong Wang and [online], Feb. 16, 2015, ****, [Heisei 30(2018) Sep. 20 search], the Internet, and <URLhttp://sports.qq.comforiginal/inside/sd313. html: > (it is cautious of how the term "" is used.) it is understood as document which supports that those who perform streaming on the Internet (individual) are called "**" in Chinese --).
Arboreal vegetation Toshihiro, "smart Tv and animation business", first edition, Jun. 11, 2012, Impress Japan, 85, 130, 131st page, and ISBN:978-4-8443-3206-0 (the page [85th] item 33 and 130th page, line 8 -) Refer to the Description "****" currently described in 131st page, line 10, respectively).

* cited by examiner

METHOD, SYSTEM AND SERVER FOR LIVE STREAMING AUDIO-VIDEO FILE

CROSS-REFERENCE TO RELATED APPLICATIONS

This is a continuation application of International Patent Application No. PCT/CN2016/074847, filed on Feb. 29, 2016, which claims priority to Chinese Patent Application No. 201510094319.X, filed on Mar. 3, 2015 and entitled "Method, device and system for live streaming audio-video file." The disclosures of these applications are incorporated herein by reference in their entirety.

BACKGROUND

With development of network technology, more and more people get their desired information over the network. For example, users may get news information over the network, or may get information of audio-video files over the network, etc. There are videos on various subjects on the network. Video-on-demand is a widely used type of service for users who wish to watch a video. For example, when a user wishes to watch a certain film, the user may search the corresponding film on a video website, and the website, after receiving a click-to-play instruction from the user, may pull data from a server to play the film. Since the video-on-demand service requires users to select a file to play, it causes a high cost on interaction.

SUMMARY

The disclosure relates to the field of video playing, and more particularly, to a method, system and server for live streaming an audio-video file.

According to a first aspect of the disclosure, a method for live streaming an audio-video file is provided, which includes the following steps: obtaining an original audio-video file; reading audio frames and video frames from the original audio-video file; transcoding the video frames into multiple set of video frames with different code rates; synthesizing the multiple set of video frames with different code rates respectively with the audio frames into multiple audio-video files with different code rates; extracting, from the multiple audio-video files with different code rates, respective audio frames and video frames, to form respective video streams; and pushing the video streams.

According to a second aspect of the disclosure, a server is provided, which includes a non-transitory computer readable storage medium and a processor, the non-transitory computer readable storage medium having instructions stored therein, wherein the instructions, when executed by the processor, cause the processor to perform the following steps: obtaining an original audio-video file; reading audio frames and video frames from the original audio-video file; transcoding the video frames into multiple set of video frames with different code rates; synthesizing the multiple set of video frames with different code rates respectively with the audio frames into multiple audio-video files with different code rates; extracting, from the multiple audio-video files with different code rates, respective audio frames and video frames, to form respective video streams; and pushing the video streams.

According to a third aspect of the disclosure, a system for live streaming an audio-video file is provided, which includes: an audio-video file synthesizing server, which is configured to obtain an original audio-video file, read audio frames and video frames from the original audio-video file, transcode the video frames into multiple set of video frames with different code rates, synthesize the multiple set of video frames with different code rates respectively with the audio frames into multiple audio-video files with different code rates; and a stream merging server, which is configured to obtain the multiple audio-video files with different code rates from the audio-video file synthesizing server, extract, from the multiple audio-video files with different code rates, respective audio frames and video frames, to form respective video streams, and push the video streams to a Content Delivery Network (CDN) server, which pushes the video streams to different terminals.

BRIEF DESCRIPTION OF THE DRAWINGS

In order to more clearly illustrate technical solutions in embodiments of the disclosure or the related art, the accompanying drawings needed in description of the embodiments or the related art are simply introduced below. Apparently, the accompanying drawings in the following description are only some embodiments of the disclosure, for persons of ordinary skill in the art, some other accompanying drawings can also be obtained according to these on the premise of not contributing creative effort.

DETAILED DESCRIPTION

For making the aim, the technical solutions and the advantages of the disclosure clearer, the disclosure is elaborated below in combination with the accompanying drawings and embodiments. It should be understood that the specific embodiments described here are only used for illustrating the disclosure and not intended to limit the disclosure.

Figure 1:
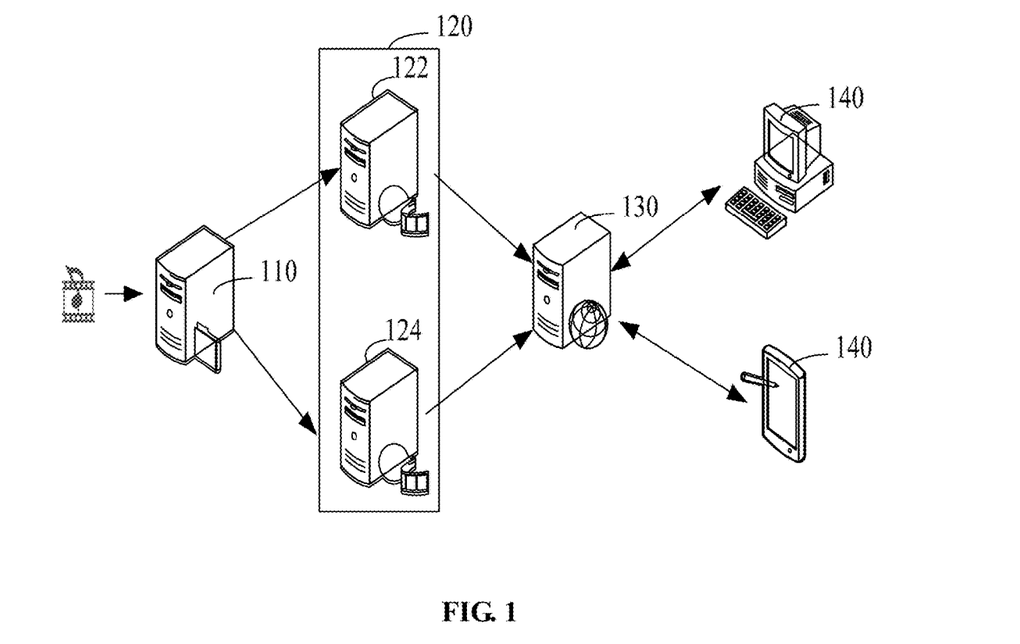
FIG. 1 is a schematic diagram illustrating an application environment of a method for live streaming an audio-video file in an embodiment.

FIG. 1 is a schematic diagram illustrating an application environment of a method for live streaming an audio-video file in an embodiment. As shown in FIG. 1, the application environment includes an audio-video file synthesizing server 110, a stream merging server 120, a Content Delivery Network (CDN) server 130, and a terminal 140.

The audio-video file synthesizing server 110 is configured to obtain an original audio-video file, read audio frames and video frames from the original audio-video file, transcode the video frames into multiple set of video frames with different code rates, and synthesize the multiple set of video frames with different code rates respectively with the audio frames into audio-video files with different code rates.

Figure 9A:
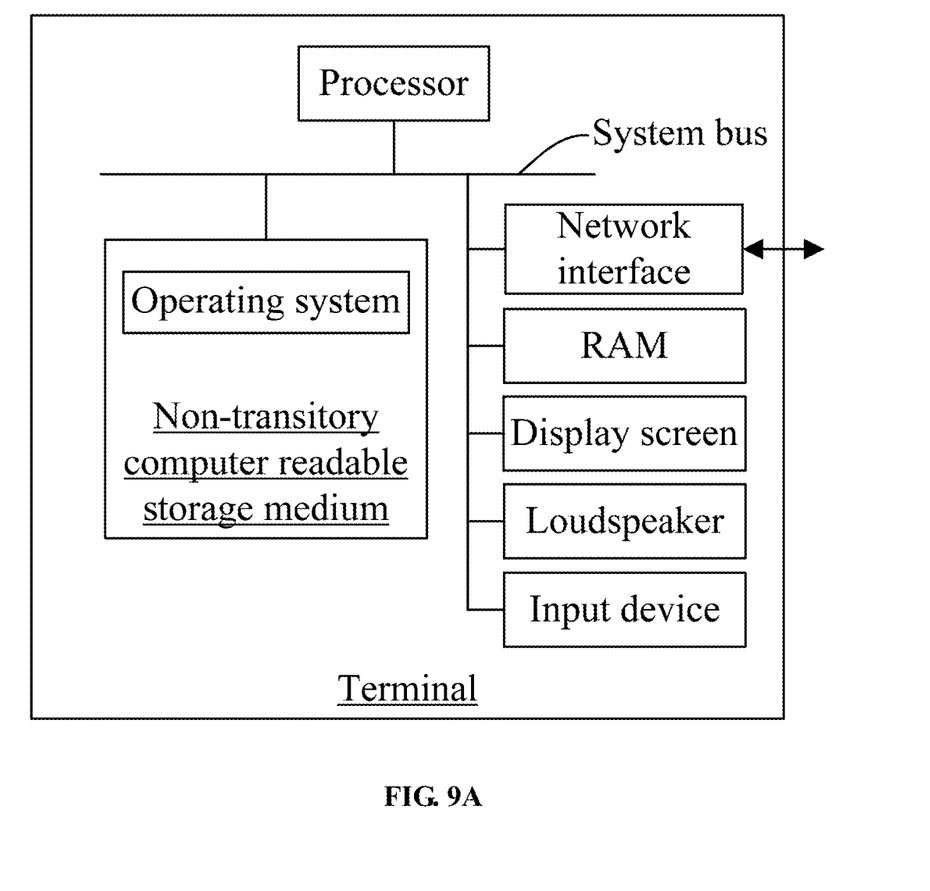
FIG. 9A is a schematic diagram illustrating the internal structure of a terminal in an embodiment.

As shown in FIG. 9A, the terminal includes a processor, a non-transitory computer readable storage medium, a Random Access Memory (RAM), a network interface, a sound collecting device, a display screen, a loudspeaker, and an input device which are connected by a system bus. The non-transitory computer readable storage medium of the terminal stores an operating system. The processor of the terminal is configured to implement the method for live streaming an audio-video file. The display screen of the terminal may be a liquid crystal display screen or an E-Ink display screen. The input device may be either a touch layer covering the display screen or a button, a trackball or a trackpad arranged on the enclosure of the terminal, or an external keyboard, trackpad or mouse. The terminal may be a mobile phone, a tablet computer, or a personal digital assistant. Those skilled in the art may understand that the structure shown in FIG. 9A is only the block diagram of a part of structure related to this application and does not form a limit to the terminal to which the subject matter of the present disclosure is applied, and the specific terminal may include more or less components than those shown in the figure, or may combine some components, or may have a different layout of components.

Figure 9B:
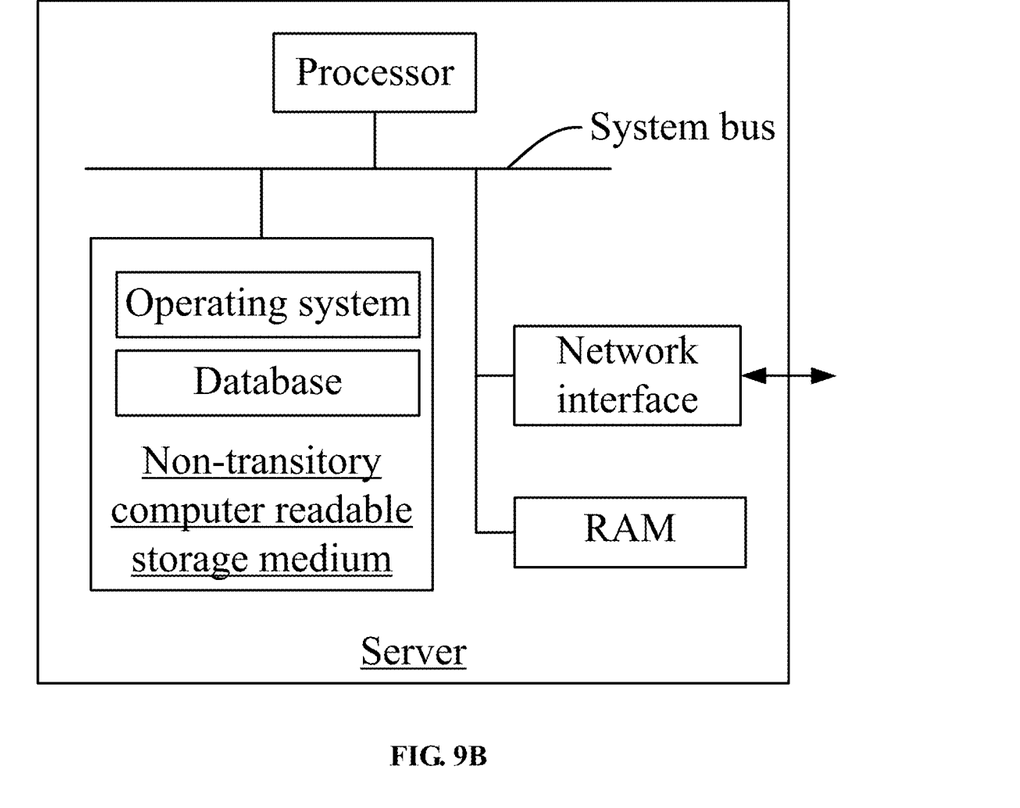
FIG. 9B is a schematic diagram illustrating the internal structure of a server in an embodiment.

As shown in FIG. 9B, the server includes a processor, a non-transitory computer readable storage medium, an RAM and a network interface which are connected by a system bus. The non-transitory computer readable storage medium of the server stores an operating system and a database in which audio-video file data are stored, and the like. The processor of the server is configured to perform the method for live streaming an audio-video file. The network interface of the server is configured to communicate with an external terminal through a network connection.

The server can be implemented by an independent server or a server cluster composed of multiple servers. Those skilled in the art may understand that the structure shown in FIG. 9B is only the block diagram of a part of structure related to this application and does not form a limit to the server to which the subject matter of the present disclosure is applied. The specific server may include more or less components than that shown in the figure, or may combine some components, or may have a different layout of components.

Figure 2:
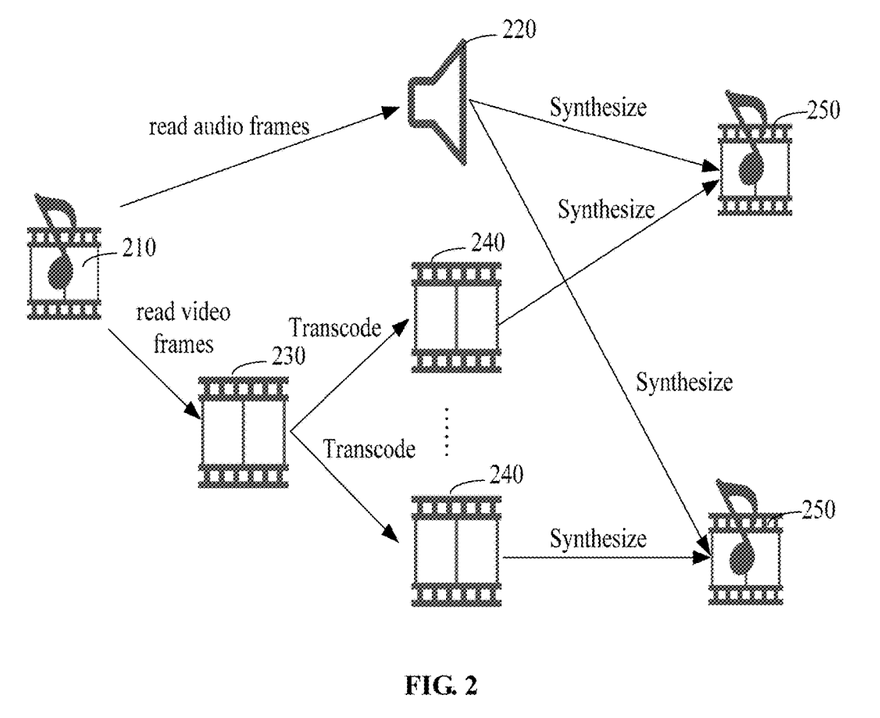
FIG. 2 is a schematic diagram illustrating a process of synthesizing multiple audio-video files with different code rates in an embodiment.

FIG. 2 is a schematic diagram illustrating a process of synthesizing multiple audio-video files with different code rates in an embodiment. As shown in FIG. 2, audio frames are extracted from the original audio-video file 210 to obtain an audio file 220, video frames are extracted to obtain a video file 230, the video file 230 is transcoded (the code rate is reduced) into a transcoded video file 240, and then the transcoded video file 240 is synthesized with the audio file 220 into audio-video files 250 with different code rates.

The stream merging server 120 may include a Flash Video (FLV) stream merging server 122, a Transport Stream (TS) stream merging server 124 and the like. Stream merging refers to synthesizing an audio stream and a video stream into a stream in FLV, TS or other formats, and outputting the synthesized stream. The streaming media format FLV is a new video format which is developed with launch of Flash MX; this new video format is mainly applied to webpage playing and can be supported by a personal computer, an Android mobile phone, and so on. The full name of TS is MPEG2-TS which can be supported by the Android system 4.0+ and the IOS system.

The stream merging server 120 is configured to obtain the audio-video files with different code rates from the audio-video file synthesizing server, extract, from the audio-video files with different code rates, the respective audio frames and video frames to form respective video streams, and push different video streams to the CDN server 130.

The FLV stream merging server 122 is configured to extract, from the audio-video files with different code rates, the respective audio frames and video frames to form respective video streams in a streaming media format.

The TS stream merging server 124 is configured to extract, from the audio-video files with different code rates, the respective audio frames and the video frames to form respective TS video streams.

The CDN servers 130 are distributed over various locations and configured to provide the user with the FLV video streams and the TS video streams.

The terminal 140 can pull the FLV video streams and the TS video streams from the CDN server 130.

The terminal 140 can be a personal computer, a smart-phone, a tablet computer, a personal digital assistant, and the like.

Figure 3:
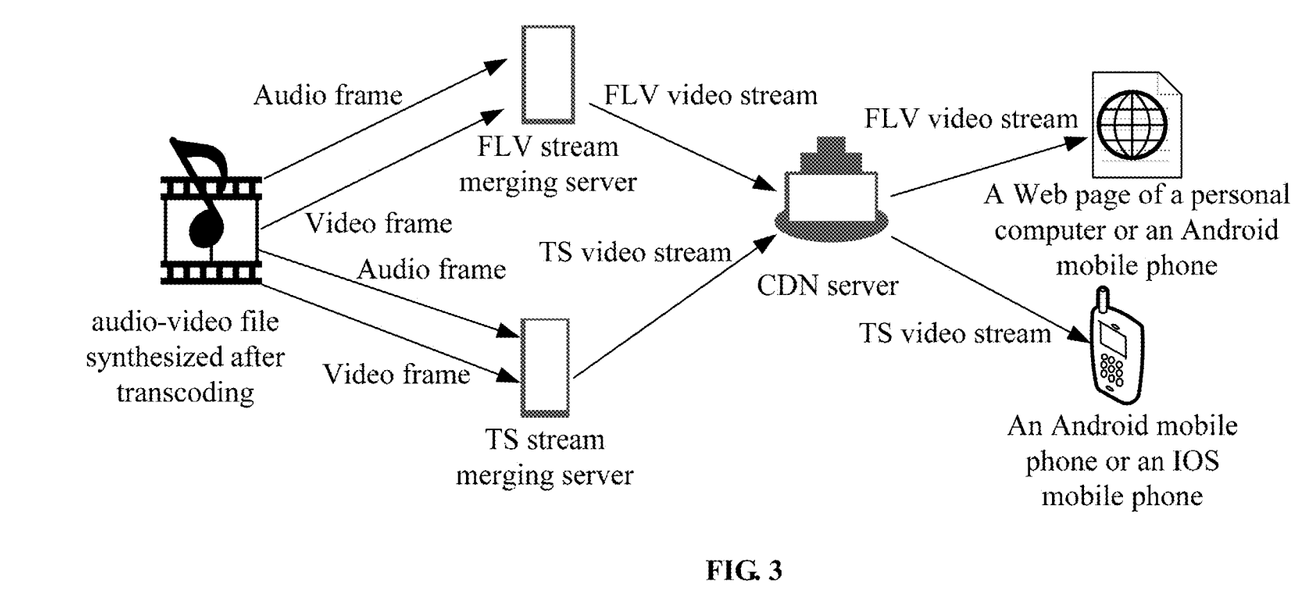
FIG. 3 is a schematic diagram illustrating a process of pushing and live streaming an audio-video file in an embodiment.

FIG. 3 is a schematic diagram illustrating a process of pushing and live streaming an audio-video file in an embodiment. As shown in FIG. 3, the audio-video file synthesizing server pushes the audio frames and the video frames in the transcoded-and-then-synthesized audio-video file to the FLV stream merging server and the TS stream merging server; the FLV stream merging server synthesizes the transcoded audio frames and video frames into the FLV video stream, and sends the FLV video stream to the CDN server; the TS stream merging server synthesizes the transcoded audio frames and video frames into the TS video stream, and sends the TS video stream to the CDN server; the CDN server pushes the FLV video stream to Web on a personal computer and an Android mobile phone, and pushes the TS video stream to an Android 4.0+ terminal device and an IOS terminal device. The personal computer in FIG. 3 may be replaced with the tablet computer, the personal digital assistant, and so on, and the mobile phone may be replaced with other mobile terminals.

After reading the audio frames and the video frames from the original audio-video file, the audio-video file synthesizing server 110 transcodes the video frames into multiple set of video frames with different code rates, and synthesizes the multiple set of video frames with different code rates respectively with the audio frames into multiple audio-video files with different code rates; then, the stream merging server merges the audio frames and the video frames in the audio-video files with different code rates to form the FLV video streams and TS video streams with different code rates, and provides the FLV video streams and the TS video streams to the user, which is convenient for the user to select different video streams to watch as his/her desires; in this way, the human operating cost for pushing and live streaming an audio-video file is reduced; besides, the adaption of multiple terminals is ensured, and a watching need in a device and bandwidth environment is met. Here, the live streaming a video file means directly pushing the video stream to the user.

Figure 4:
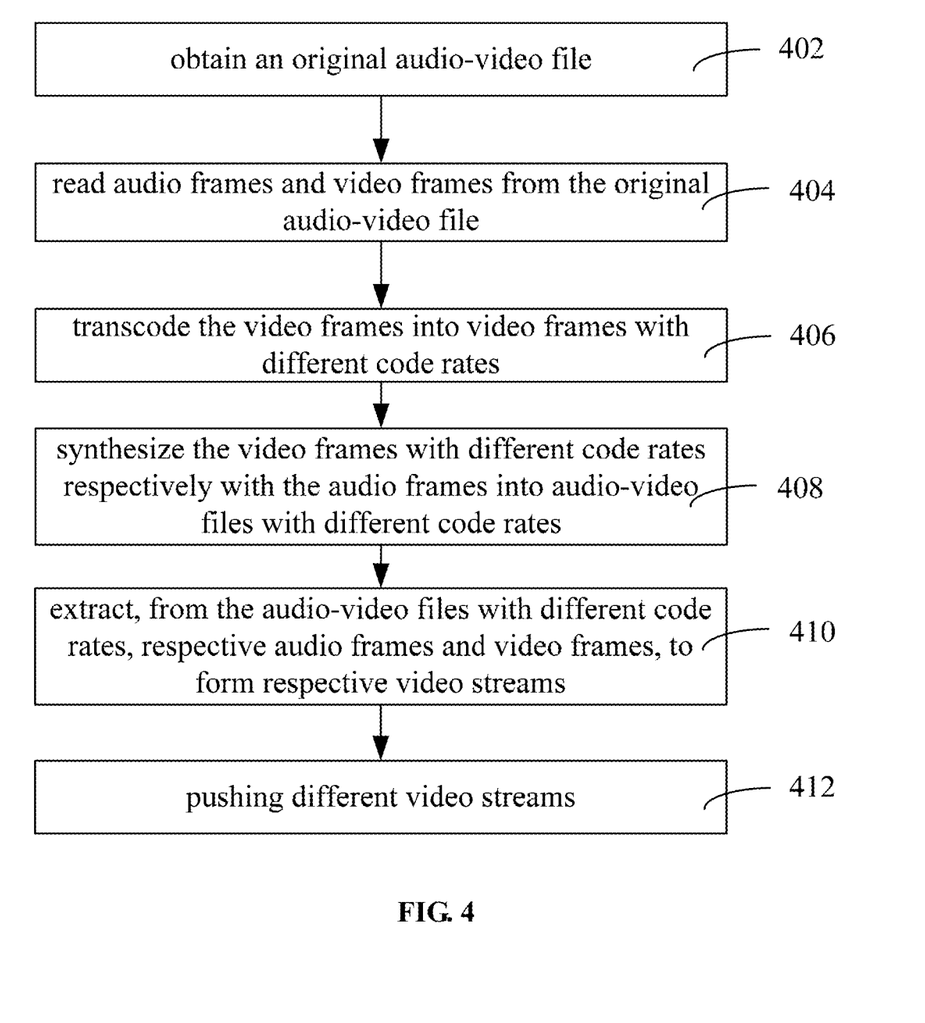
FIG. 4 is a flow chart showing a method for live streaming an audio-video file in an embodiment.

FIG. 4 is a flow chart showing a method for live streaming an audio-video file in an embodiment. The method for live streaming an audio-video file in FIG. 4 is applied to the application environment in FIG. 1. As shown in FIG. 4, the method for live streaming an audio-video file includes steps as follows.

Step 402: an original audio-video file is obtained.

Particularly, the original audio-video file may be a high-definition video file which is recorded by a video recorder in live streaming or other live ways. The code rate of the video file in the original audio-video file may be 1 Mbps (Mega bit per second), 2 Mbps, 3 Mbps, and so on.

In an embodiment, the step of obtaining the original audio-video file includes that: the audio-video file played repeatedly is read circularly and regarded as the original audio-video file.

For example, for a gap of live streaming services, i.e., a period of time in which no anchor is on duty, there is no requirement for the content of the video to be played, and the audio-video file can be played repeatedly. When the anchor is offline, the video may be switched to a replay mode according to the switching instruction received from a Web operation page, and the video file is played repeatedly in the replay mode.

In other embodiments, the step of obtaining the original audio-video file includes that: a program guide is obtained; when a given time point arrives, an audio-video file corresponding to a program in the program guide is read, and the audio-video file is regarded as the original audio-video file.

For example, if it is desired to play the corresponding video file at fixed time according to the program guide, first the program guide can be obtained through the audio-video file synthesizing server, then the given time point is triggered by using a timer, the audio-video file corresponding to the program in the program guide is read, and the audio-video file is regarded as the original audio-video file.

The original audio-video file is stored at the audio-video file synthesizing server. The operating system of the audio-video file synthesizing server may be Linux, Windows, and so on.

Step 404: audio frames and video frames are read from the original audio-video file.

Particularly, after the audio frames and the video frames are read from the original audio-video file, the audio frames and the video frames are marked to be distinguishable from each other, i.e., a first identifier is used for identifying the audio frames, and a second identifier is used for identifying the video frames; for example, the first identifier is 1, and the second identifier is 0, but they are not limited thereto.

Step 406: the video frames are transcoded into multiple set of video frames with different code rates.

Particularly, the code rate of the video file in the original audio-video file may be 1 Mbps (Mega bit per second), 2 Mbps, 3 Mbps, and so on; the code rate of a transcoded video file may be 1024 kbps (kilo bit per second), 800 kbps, 480 kbps, 360 kbps, and so on, but it is not limited thereto.

A video code rate refers to a number of data bits transmitted in unit time, and its unit is kbps (kilo bit per second). Video transcoding refers to reducing the code rate and resolution of the video to adapt it to different hardware and software playing environments. The resolution is a parameter for measuring data volume in an image and usually expressed as pixel(s) per inch (ppi(s)), i.e., valid pixel(s) in horizontal and vertical directions; when a window is small, the ppi value is high, and the image is clear; when the window is big, because there are not so many valid pixels to fill the window, the ppi value is reduced, and the image is blurring.

An X264-based self-optimized encoder is used for transcoding the video frames into multiple set of video frames with different code rates. The X264-based encoder optimizes the image quality with respect to a video service scenario, and optimizes algorithm CPU and memory consumption, thus resulting in a relatively high transcoding efficiency, higher speed, and higher definition at the same code rate.

Step 408: the multiple set of video frames with different code rates are synthesized respectively with the audio frame into multiple audio-video files with different code rates.

Particularly, when each frame is read, corresponding information of each frame is written into the transcoded audio-video file. The corresponding information includes an audio-video type identifier, a decoding timestamp, a display timestamp, whether it is a key frame, the code rate, and so on. The audio-video type identifier is an identifier for identifying the audio frames or the video frames; for example, the first identifier identifies the audio frames, and the second identifier identifies the video frames.

Step 410: the audio frames and the video frames are extracted from the audio-video files with different code rates respectively to form respective video streams.

In the present embodiment, the step of separately extracting the audio frames and the video frames from the audio-video files with different code rates includes that: the audio frames and the video frames are separately extracted from the audio-video files with different code rates to form respective video streams in the streaming media format and the high-definition video package format.

Particularly, the video stream in the streaming media format may be the FLV video stream, and the video stream in the high-definition video package format may be the TS video stream. The audio frames and the video frames are separately extracted from the audio-video files with different code rates and synthesized by the FLV stream merging server into the FLV video streams with different code rates; the audio frames and the video frames are separately extracted from the audio-video files with different code rates and synthesized by the TS stream merging server into the TS video streams with different code rates.

For example, if the code rates after transcoding are 800 kbps and 480 kbps respectively, then the video stream after stream merging may be the FLV video stream of 800 kbps, the FLV video stream of 480 kbps, the TS video stream of 800 kbps, and the TS video stream of 480 kbps.

Step 412: different video streams are pushed.

Particularly, the different video streams are pushed to the CDN server, and then pushed by the CDN server to various different terminals, so that the user selects one of the video streams with different code rates as he/she desires. Each video stream corresponds to a Uniform Resource Locator (URL). The URL of the video stream is pushed to the user for selection.

Besides, for each video stream, it is also possible to assign a unique video stream identifier to the video stream, then a corresponding relationship between the video stream identifiers and the URLs are established, and the URLs are pushed to the user.

In the method for live streaming an audio-video file described above, the original audio-video file is transcoded, and the transcoded audio and video files are synthesized into the audio-video files with different code rates, are the audio-video files with different code rates are stream-synthesized into the video streams with different code rates, and the video streams with different code rates are pushed to various different terminals, thus saving the labor cost for intervening in live streaming of files, reducing the cost on interaction, meeting requirements of different devices and bandwidths, and improving the fluency of live streaming of the video file.

Figure 5:
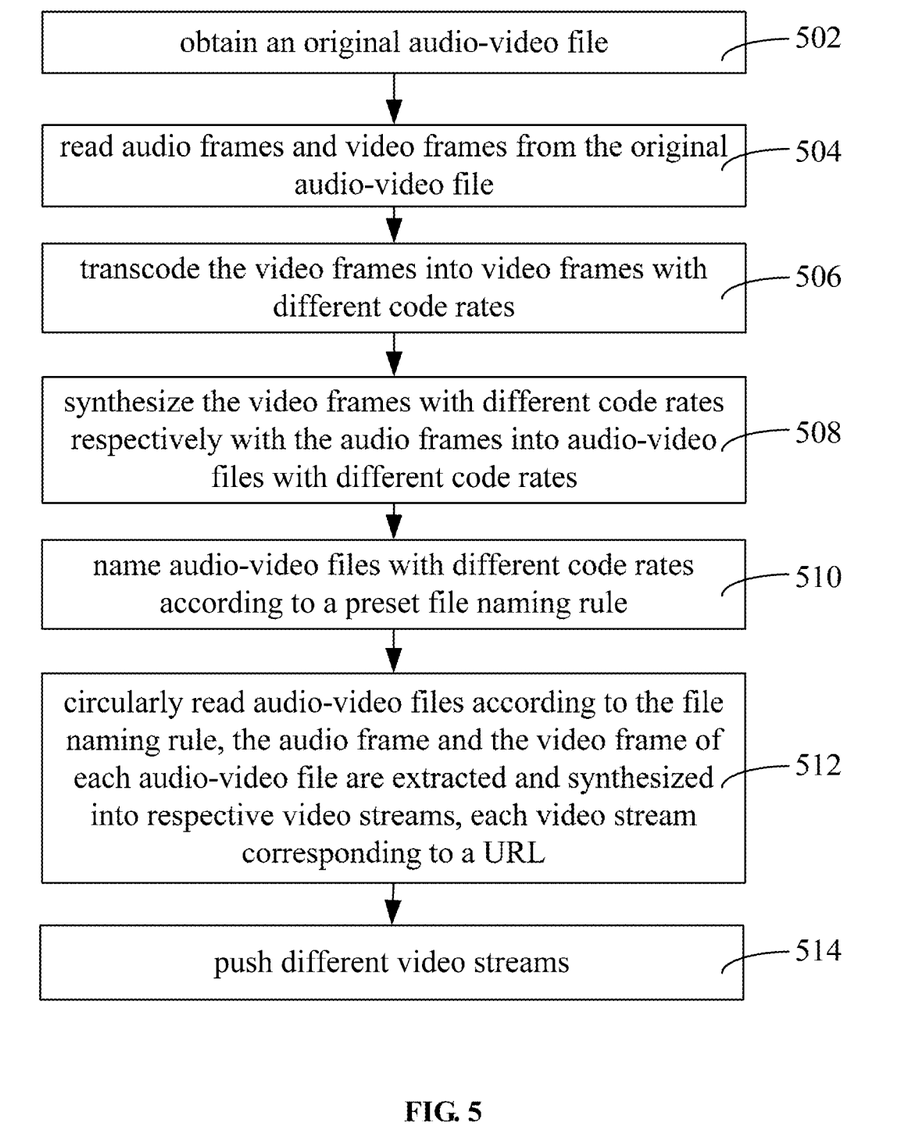
FIG. 5 is a flow chart showing a method for live streaming an audio-video file in another embodiment.

FIG. 5 is a flow chart showing a method for live streaming an audio-video file in another embodiment. As shown in FIG. 5, the method for live streaming an audio-video file includes steps as follows.

Step 502: an original audio-video file is obtained.

Particularly, the original audio-video file may be a high-definition video file which is recorded by the video recorder in live streaming or other live ways. The code rate of the video file in the original audio-video file may be 1 Mbps (Mega bit per second), 2 Mbps, 3 Mbps, and so on.

In an embodiment, the step of obtaining the original audio-video file includes that: the audio-video file played repeatedly is read circularly and regarded as the original audio-video file.

For example, for a gap of live streaming services, i.e., a period of time in which no anchor is on duty, there is no requirement for the content of the video to be played, and the audio-video file can be played repeatedly. When the anchor is offline, the video may be switched to a replay mode according to the switching instruction received from a Web operation page, and the video file is played repeatedly in the replay mode.

In other embodiments, the step of obtaining the original audio-video file includes that: the program guide is obtained; when the given time point arrives, the audio-video file corresponding to the program in the program guide is read, and the audio-video file is regarded as the original audio-video file.

For example, if it is desired to play the corresponding video file at fixed time according to the program guide, first the program guide can be obtained through the audio-video file synthesizing server, then the given time point is triggered by using a timer, the audio-video file corresponding to the program in the program guide is read, and the audio-video file is regarded as the original audio-video file.

Step 504: audio frames and video frames are read from the original audio-video file.

Particularly, after the audio frames and the video frames are read from the original audio-video file, the audio frames and the video frames are marked to be distinguishable from each other, i.e., a first identifier is used for identifying the audio frames, and a second identifier is used for identifying the video frames; for example, the first identifier is 1, and the second identifier is 0, but they are not limited thereto.

Step 506: the video frames are transcoded into multiple set of video frames with different code rates.

Particularly, the code rate of the video file in the original audio-video file may be 1 Mbps (Mega bit per second), 2 Mbps, 3 Mbps, and so on; the code rate of a transcoded video file may be 1024 kbps (kilo bit per second), 800 kbps, 480 kbps, 360 kbps, and so on, but it is not limited thereto.

Step 508: the video frames with different code rates are synthesized respectively with the audio frame into audio-video files with different code rates.

Step 510: the audio-video files with different code rates are named according to a preset file naming rule.

Particularly, the preset file naming rule may include a file name, the code rate after transcoding, a suffix, and so on, which are used for differentiating the video files with different code rates for a same video.

Step 512: the audio-video file is read circularly according to the file naming rule; the audio frames and the video frames of each audio-video file are extracted and synthesized into respective video streams, each video stream corresponding to a URL.

Step 514: different video streams are pushed.

Particularly, the different video streams are pushed to the CDN server, and then pushed by the CDN server to various different terminals, so that the user selects one of the video streams with different code rates as he/she desires. Each video stream corresponds to a URL. The URLs of the video streams are pushed to the user for selection.

Besides, when the method for live streaming an audio-video file is applied to the room of the anchor, it is also possible to establish a corresponding relationship between the room number of the anchor and the audio-video file, and push the transcoded audio-video file to the corresponding room number of the anchor.

In the method for live streaming an audio-video file described above, the original audio-video file is transcoded, and the transcoded audio and video files are synthesized into the audio-video files with different code rates, the audio-video files with different code rates are stream-synthesized into the video streams with different code rates, and the video streams with different code rates are pushed to various different terminals, thus saving the labor cost for intervening in live streaming of files, reducing the cost on interaction, meeting requirements of different devices and bandwidths, and improving the fluency of live streaming of the video file. The audio-video files with different code rates are differentiated according to the file naming rule, and thus can be identified simply and conveniently.

Figure 6:
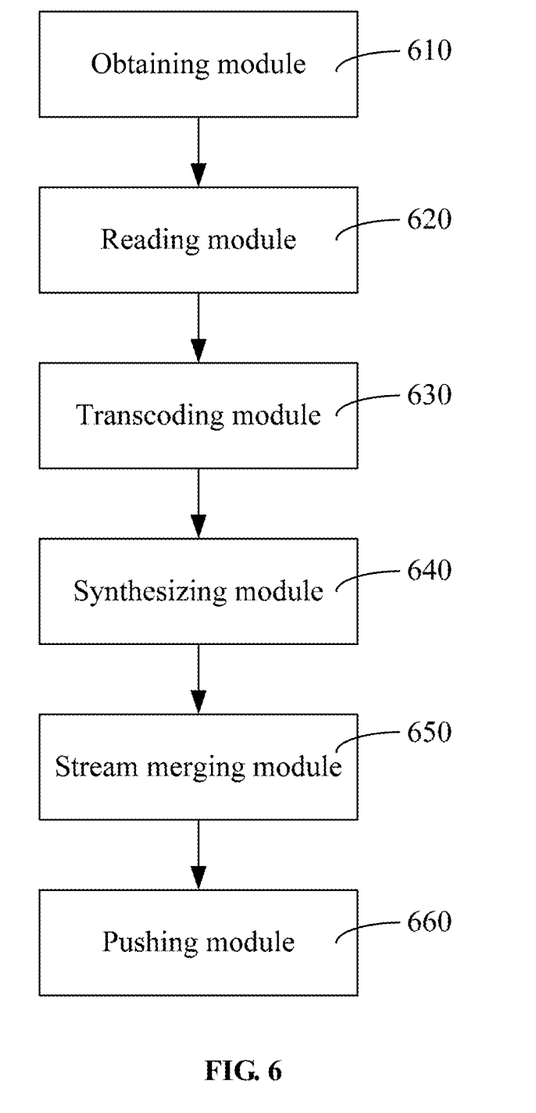
FIG. 6 is a block diagram of a device for live streaming an audio-video file in an embodiment.

FIG. 6 is a block diagram of a device for live streaming an audio-video file in an embodiment. As shown in FIG. 6, the device for live streaming an audio-video file includes an obtaining module 610, a reading module 620, a transcoding module 630, a synthesizing module 640, a stream merging module 650, and a pushing module 660.

The obtaining module 610 is configured to obtain the original audio-video file.

Particularly, the original audio-video file may be the high-definition video file which is recorded by the video recorder in live streaming or other live ways. The code rate of the video file in the original audio-video file may be 1 Mbps, 2 Mbps, 3 Mbps, and so on.

In an embodiment, the obtaining module 610 is further configured to circularly read the audio-video file played repeatedly and regard the audio-video file played repeatedly as the original audio-video file. For example, for a gap of live streaming services, i.e., a period of time in which no anchor is on duty, there is no requirement for the content of the video to be played, and the audio-video file can be played repeatedly. When the anchor is offline, the video may be switched to a replay mode according to the switching instruction received from a Web operation page, and the video file is played repeatedly in the replay mode.

The obtaining module 610 may further be configured to obtain the program guide, when the given time point arrives, read the audio-video file corresponding to the program in the program guide, and regard the audio-video file as the original audio-video file.

For example, if it is desired to play the corresponding video file at fixed time according to the program guide, first the program guide can be obtained through the audio-video file synthesizing server, then the given time point is triggered by using a timer, the audio-video file corresponding to the program in the program guide is read, and the audio-video file is regarded as the original audio-video file.

The original audio-video file is stored at the audio-video file synthesizing server. The operating system of the audio-video file synthesizing server may be Linux, Windows, and so on.

The reading module 620 is configured to read the audio frames and the video frames from the original audio-video file. Particularly, after the audio frames and the video frames are read from the original audio-video file, the audio frames and the video frames are marked to be distinguishable from each other, i.e., a first identifier is used for identifying the audio frames, and a second identifier is used for identifying the video frames; for example, the first identifier is 1, and the second identifier is 0, but they are not limited thereto.

The transcoding module 630 is configured to transcode the video frames into multiple set of video frames with different code rates. Particularly, the code rate of the video file in the original audio-video file may be 1 Mbps, 2 Mbps, 3 Mbps, and so on; the code rate of a transcoded video file may be 1024 kbps, 800 kbps, 480 kbps, 360 kbps, and so on, but it is not limited to this.

The synthesizing module 640 is configured to synthesize the multiple set of video frames with different code rates respectively with the audio frames into the audio-video files with different code rates.

Particularly, when each frame is read, corresponding information of each frame is written into the transcoded audio-video file. The corresponding information includes the audio-video type identifier, the decoding timestamp, the display timestamp, whether it is the key frame, the code rate, and so on. The audio-video type identifier is the identifier for identifying the audio frames and the video frames; for example, the first identifier identifies the audio frames, and the second identifier identifies the video frames.

The stream merging module 650 is configured to separately extract the audio frames and the video frames from the audio-video files with different code rates to form respective video streams.

In the present embodiment, the stream merging module 650 is configured to separately extract the audio frames and the video frames from the audio-video files with different code rates to form respective video streams in the streaming media format and the high-definition video package format.

Particularly, the video stream in the streaming media format may be the FLV video stream, and the video stream in the high-definition video package format may be the TS video stream. The audio frames and the video frames are separately extracted from the audio-video files with the different code rates and synthesized by the FLV stream merging server into the FLV video streams with different code rates; the audio frames and the video frames are separately extracted from the audio-video files with the different code rates and synthesized by the TS stream merging server into the TS video streams with different code rates.

For example, if the code rates after transcoding are 800 kbps and 480 kbps respectively, then the video stream after stream merging can be the FLV video stream of 800 kbps, the FLV video stream of 480 kbps, the TS video stream of 800 kbps, and the TS video stream of 480 kbps.

The pushing module 660 is configured to push the different video streams. Particularly, the different video streams are pushed to the CDN server, and then pushed by the CDN server to various different terminals, so that the user selects the video streams with different code rates as he/she desires. Each video stream corresponds to a URL. The URLs of the video streams are pushed to the user for selection.

Besides, for each video stream, it is also possible to assign a unique video stream identifier to the video stream, then the corresponding relationship between the video stream identifiers and the URLs are established, and the URLs are pushed to the user.

In the device for live streaming an audio-video file described above, the original audio-video file is transcoded, and the transcoded audio and video files are synthesized into the audio-video files with different code rates, the audio-video files with different code rates are stream-synthesized into the video streams with different code rates, and the video streams with different code rates are pushed to various different terminals, thus saving the labor cost for intervening in live streaming of files, reducing the cost on interaction, meeting requirements of different devices and bandwidths, and improving the fluency of live streaming of the video file.

Figure 7:
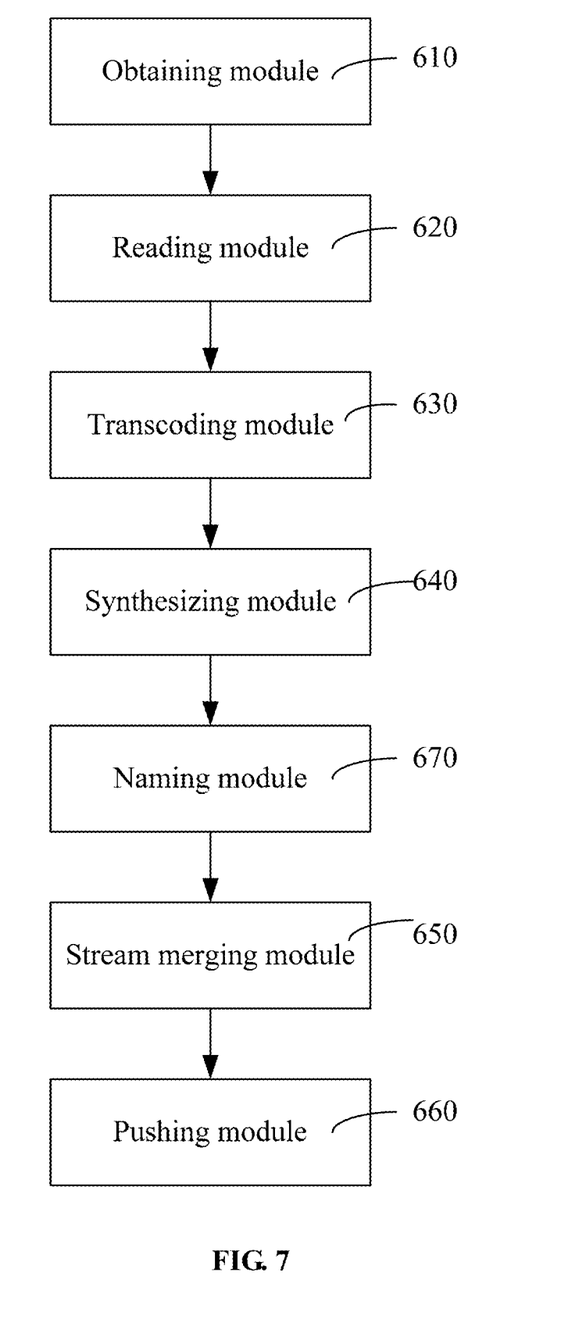
FIG. 7 is a block diagram of a device for live streaming an audio-video file in another embodiment.

FIG. 7 is a block diagram of a device for live streaming an audio-video file in another embodiment. As shown in FIG. 7, the device for live streaming an audio-video file further includes a naming module 670, in addition to the obtaining module 610, the reading module 620, the transcoding module 630, the synthesizing module 640, the stream merging module 650, and the pushing module 660.

The naming module 670 is configured to, after the video frames with different code rates are separately synthesized with the audio frames into the audio-video files with different code rates, name the audio-video files with different code rates according to the preset file naming rule.

Particularly, the preset file naming rule may include the file name, the code rate after transcoding, the suffix, and so on, which are used for differentiating the video files with different code rates for a same video.

The stream merging module 650 is further configured to circularly read the audio-video file according to the file naming rule, and extract the audio frames and the video frames of each audio-video file and synthesize the extracted the audio frames and the video frames into respective video streams, each video stream corresponding to a URL.

The audio-video files with different code rates are differentiated according to the file naming rule, and thus can be identified simply and conveniently.

Figure 8:
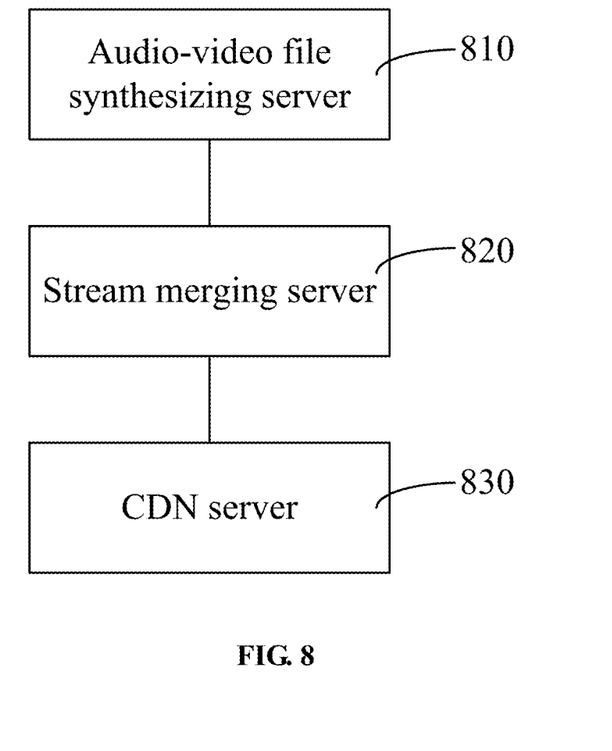
FIG. 8 is a block diagram of a system for live streaming an audio-video file in an embodiment.

FIG. 8 is a block diagram of a system for live streaming an audio-video file in an embodiment. As shown in FIG. 8, the system for live streaming an audio-video file includes an audio-video file synthesizing server 810, a stream merging server 820, and a CDN server 830. Please turn to the description with reference to FIG. 1 for detailed description of this embodiment.

The audio-video file synthesizing server 810 is configured to obtain the original audio-video file, read the audio frames and the video frames from the original audio-video file, transcode the video frames into the multiple set of video frames with different code rates, and synthesize the multiple set of video frames with different code rates respectively with the audio frames into the audio-video files with different code rates.

Particularly, the original audio-video file may be the high-definition video file which is recorded by the video recorder in live streaming or other live ways. The code rate of the video file in the original audio-video file may be 1 Mbps, 2 Mbps, 3 Mbps, and so on.

In an embodiment, the audio-video file synthesizing server 810 is further configured to circularly read the audio-video file played repeatedly and regard the audio-video file played repeatedly as the original audio-video file. For example, for a gap of live streaming services, i.e., a period of time in which no anchor is on duty, there is no requirement for the content of the video to be played, and the audio-video file can be played repeatedly. When the anchor is offline, the video may be switched to a replay mode according to the switching instruction received from a Web operation page, and the video file is played repeatedly in the replay mode.

In other embodiments, the audio-video file synthesizing server 810 is further configured to obtain the program guide, the given time point arrives, read the audio-video file corresponding to the program in the program guide, and regard the audio-video file as the original audio-video file. For example, if it is desired to play the corresponding video file at fixed time according to the program guide, first the program guide can be obtained through the audio-video file synthesizing server, then the given time point is triggered by using a timer, the audio-video file corresponding to the program in the program guide is read, and the audio-video file is regarded as the original audio-video file. The original audio-video file is stored at the audio-video file synthesizing server. The operating system of the audio-video file synthesizing server may be Linux, Windows, and so on.

After the audio frames and the video frames are read from the original audio-video file, the audio frames and the video frames are marked separately; the first identifier is used for identifying the audio frames, and the second identifier is used for identifying the video frames; for example, the first identifier is 1, and the second identifier is 0, but they are not limited thereto. The code rate of the video file in the original audio-video file may be 1 Mbps, 2 Mbps, 3 Mbps, and so on; the code rate of the transcoded video file may be 1024 kbps, 800 kbps, 480 kbps, 360 kbps, and so on, but it is not limited thereto.

A video code rate refers to a number of data bits transmitted in unit time, and its unit is kbps (kilo bit per second). Video transcoding refers to reducing the code rate and resolution of the video to adapt it to different hardware and software playing environments. The resolution is a parameter for measuring data volume in an image and usually expressed as pixel(s) per inch (ppi(s)), i.e., valid pixel(s) in horizontal and vertical directions; when a window is small, the ppi value is high, and the image is clear; when the window is big, because there are not so many valid pixels to fill the window, the ppi value is reduced, and the image is blurring.

An X264-based self-optimized encoder is used for transcoding the video frames into multiple set of video frames with different code rates. The X264-based encoder optimizes the image quality with respect to a video service scenario, and optimizes algorithm CPU and memory consumption, thus resulting in a relatively high transcoding efficiency, higher speed, and higher definition at the same code rate.

When reading each frame, the audio-video file synthesizing server 810 writes the corresponding information of each frame into the transcoded audio-video file. The corresponding information includes the audio-video type identifier, the decoding timestamp, the display timestamp, whether it is the key frame, the code rate, and so on. The audio-video type identifier is the identifier for identifying the audio frames or the video frames; for example, the first identifier identifies the audio frames, and the second identifier identifies the video frames.

The stream merging server 820 is configured to obtain the audio-video files with different code rates from the audio-video file synthesizing server, separately extract the audio frames and the video frames from the audio-video files with different code rates to form respective video streams, and push the different video streams to the CDN server 830.

In the present embodiment, the stream merging server 820 includes a streaming-media-format stream merging server and a high-definition-video-package-format stream merging server.

The streaming-media-format stream merging server is configured to separately extract the audio frames and the video frames from the audio-video files with different code rates to form respective video streams in the streaming media format.

The high-definition-video-package-format stream merging server is configured to separately extract the audio frames and the video frames from the audio-video files with different code rates to form respective video streams in the high-definition video package format. The stream merging server 820 is configured to extract, from the audio-video files with different code rates, the respective audio frames and video frames to form respective video streams in the streaming media format and the high-definition video package format.

Particularly, the video stream in the streaming media format may be the FLV video stream, and the video stream in the high-definition video package format may be the TS video stream. The audio frames and the video frames are separately extracted from the audio-video files with the different code rates and synthesized by the FLV stream merging server into the FLV video streams with different code rates; the audio frames and the video frames are separately extracted from the audio-video files with the different code rates and synthesized by the TS stream merging server into the TS video streams at different code rates.

For example, if the code rates after transcoding are 800 kbps and 480 kbps respectively, then the video streams after stream merging may be a FLV video stream of 800 kbps, a FLV video stream of 480 kbps, a TS video stream of 800 kbps, and a TS video stream of 480 kbps The CDN server 830 is configured to push the different video streams to different terminals. The terminal may be the personal computer, the smartphone, the tablet computer, the personal digital assistant, and the like. The CDN server 830 pushes the FLV video stream to Web on the personal computer or the terminal with the Android system, and pushes the TS video stream to the terminal with the IOS system or the terminal with the Android 4.0+ system. The audio-video file synthesizing server 810 is further configured to, after the multiple set of video frames with different code rates are synthesized respectively with the audio frames into the audio-video files with different code rates, name the audio-video files with different code rates according to the preset file naming rule, circularly read the audio-video file according to the file naming rule, and extract and synthesize the audio frames and the video frames of each audio-video file into respective video streams, each video stream corresponding to a URL.

In an embodiment, the CDN server 830 is further configured to push the URL corresponding to each video stream to the user.

In an embodiment, the CDN server 830 is further configured to establish the corresponding relationship between the room number of the anchor and the audio-video file, and push the transcoded audio-video file to the corresponding room number of the anchor.

In the system for live streaming an audio-video file described above, the original audio-video file is transcoded, and the transcoded audio and video files are synthesized into the audio-video files with different code rates, the audio-video files with different code rates are stream-synthesized into the video streams with different code rates, and the video streams with different code rates are pushed to various different terminals, thus saving the labor cost for intervening in live streaming of files, reducing the cost on interaction, meeting requirements of different devices and bandwidths, and improving the fluency of live streaming of the video file.

Persons of ordinary skill in the art can understand that all or part of the flows in the embodiments of the method can be completed by instructing related hardware through a computer program. The program can be stored in a non-transitory computer-readable storage medium; when the program is executed, the flows of the embodiments of the method can be included. Wherein, the non-transitory computer-readable storage medium can be a magnetic disk, a compact disk, a Read-Only Memory (ROM), and so on.

The above embodiments only express several embodiments of the disclosure, and the description is comparatively specific and detailed; however, the above embodiments cannot be understood as a limit to the scope of the disclosure. It should be indicated that, on the premise of not departing from the conception of the disclosure, persons of ordinary skill in the art may also make a number of modifications and improvements which fall within the scope of the disclosure. As such, the scope of the disclosure is only be limited by the appended claims.

The invention claimed is:

1. A method for live streaming an audio-video file, applied in a server, the method comprising:
    obtaining an original audio-video file;
    reading audio frames and video frames from the original audio-video file;
    transcoding the video frames into multiple set of video frames with different code rates;
    synthesizing the multiple set of video frames with different code rates respectively with the audio frames into multiple audio-video files with different code rates;
    extracting, from the multiple audio-video files with different code rates, respective audio frames and video frames, to form respective video streams; and
    pushing the video streams,
    wherein after synthesizing the multiple set of video frames with different code rates respectively with the audio frames into multiple audio-video files with different code rates, the method further comprises:
    naming the multiple audio-video files with different code rates according to a preset file naming rule;
    wherein extracting, from the multiple audio-video files with different code rates, respective audio frames and the video frames, to form respective video streams comprises:
    circularly reading the multiple audio-video files according to the file naming rule, and extracting, from the multiple audio-video files with different code rates, respective audio frames and the video frames, and synthesizing the extracted respective audio frames and video frames into the respective video streams, wherein each of the video streams corresponds to a Uniform Resource Locator (URL).

2. The method of claim 1, wherein obtaining the original audio-video file comprises:
    circularly reading an audio-video file played repeatedly, and regarding the audio-video file played repeatedly as the original audio-video file.

3. The method of claim 1, wherein obtaining the original audio-video file comprises:
    obtaining a program guide;
    when a given time point arrives, reading an audio-video file corresponding to a program in the program guide, and regarding the audio-video file as the original audio-video file.

4. The method of claim 1, wherein extracting, from the multiple audio-video files with different code rates, respective audio frames and video frames, to form respective video streams comprises:
    extracting, from the multiple audio-video files with different code rates, respective audio frames and video frames, to form respective video streams in a streaming media format and a high-definition video package format.

5. The method of claim 1, further comprising:
    pushing the URLs, each corresponding to a respective one of the video streams, to a user.

6. The method of claim 1, further comprising:
    establishing a corresponding relationship between a room number of an anchor and the original audio-video file; and
    pushing the transcoded audio-video files to the corresponding room number of the anchor.

7. A server, comprising a non-transitory computer readable storage medium and a processor, the non-transitory computer readable storage medium having instructions stored therein, wherein the instructions, when executed by the processor, cause the processor to perform the following steps:
    obtaining an original audio-video file;
    reading audio frames and video frames from the original audio-video file;
    transcoding the video frames into multiple set of video frames with different code rates;
    synthesizing the multiple set of video frames with different code rates respectively with the audio frames into multiple audio-video files with different code rates;
    extracting, from the multiple audio-video files with different code rates, respective audio frames and video frames, to form respective video streams; and
    pushing the video streams,
    wherein after synthesizing the multiple set of video frames with different code rates respectively with the audio frames into multiple audio-video files with different code rates, the processor is further configured to perform the following steps:
    naming the multiple audio-video files with different code rates according to a preset file naming rule;
    wherein extracting, from the multiple audio-video files with different code rates, respective audio frames and the video frames, to form respective video streams comprises:
    circularly reading the multiple audio-video files according to the file naming rule, and extracting, from the multiple audio-video files with different code rates, respective audio frames and video frames, and synthesizing the extracted respective audio frames and video frames into the respective video streams, wherein each of the video streams corresponds to a Uniform Resource Locator (URL).

8. The server of claim 7, wherein obtaining the original audio-video file comprises:
    circularly reading the multiple audio-video file played repeatedly, and regarding the audio-video file played repeatedly as the original audio-video file.

9. The server of claim 7, wherein obtaining the original audio-video file comprises:

obtaining a program guide;
when a given time point arrives, reading an audio-video file corresponding to a program in the program guide, and regarding the audio-video file as the original audio-video file.

10. The server of claim 7, wherein extracting, from the multiple audio-video files with different code rates, respective audio frames and video frames, to form respective video streams comprises:
extracting, from the multiple audio-video files with different code rates, respective audio frames and video frames, to form respective video streams in a streaming media format and a high-definition video package format.

11. The server of claim 7, wherein the processor is further configured to perform the following steps:
pushing the URLs, each corresponding to a respective one of the video streams, to a user.

12. The server of claim 7, wherein the processor is further configured to perform the following steps:
establishing a corresponding relationship between a room number of an anchor and the original audio-video file; and
pushing the transcoded audio-video files to the corresponding room number of the anchor.

13. A system for live streaming an audio-video file, comprising:
an audio-video file synthesizing server, which is configured to obtain an original audio-video file, read audio frames and video frames from the original audio-video file, transcode the video frames into multiple set of video frames with different code rates, synthesize the multiple set of video frames with different code rates respectively with the audio frames into multiple audio-video files with different code rates; and
a stream merging server, which is configured to obtain the multiple audio-video files with different code rates from the audio-video file synthesizing server, extract, from the multiple audio-video files with different code rates, respective audio frames and video frames, to form respective video streams, and push the video streams to a Content Delivery Network (CDN) server, which pushes the video streams to different terminals,
wherein the audio-video file synthesizing server is further configured to, after synthesizing the multiple set of video frames with different code rates respectively with the audio frames into multiple audio-video files with different code rates, name the multiple audio-video files with different code rates according to a preset file naming rule, circularly read the multiple audio-video files according to the file naming rule, extract, from the multiple audio-video files with different code rates, respective audio frames and video frames, and synthesize the extracted respective audio frames and video frames into respective video streams, wherein each of the video streams corresponds to a Uniform Resource Locator (URL),
wherein the CDN server is further configured to push the URLs, each corresponding to a respective one of the video streams, to a user.

14. The system of claim 13, wherein the audio-video file synthesizing server is further configured to circularly read an audio-video file played repeatedly, and regard the audio-video file played repeatedly as the original audio-video file.

15. The system of claim 13, wherein the audio-video file synthesizing server is further configured to obtain a program guide, and when a given time point arrives, read an audio-video file corresponding to a program in the program guide, and regard the audio-video file as the original audio-video file.

16. The system of claim 13, wherein the stream merging server comprises:
a streaming-media-format stream merging server, which is configured to extract, from the multiple audio-video files with different code rates, respective audio frames and video frames, to form respective video streams in a streaming media format; and
a high-definition-video-encapsulation-format stream merging server, which is configured to extract, from the multiple audio-video files with different code rates, respective audio frames and video frames, to form respective video streams in a high-definition video package format.

* * * * *